April 4, 1944.   M. A. WECKERLY   2,346,121
WEIGHING SCALE
Filed July 30, 1940   3 Sheets-Sheet 1
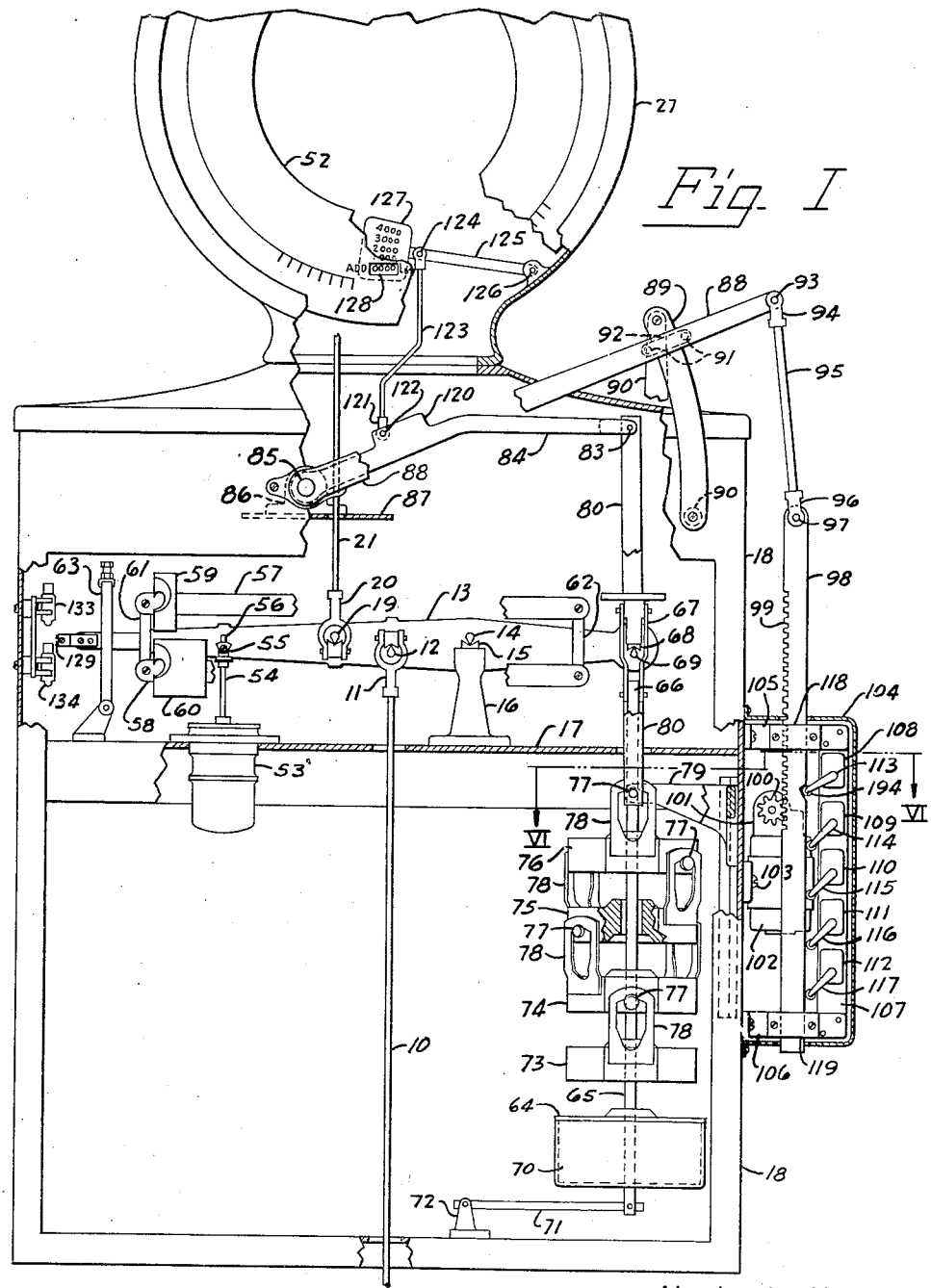
Fig. I
Mark A. Weckerly
INVENTOR
BY Marshall & Marshall
ATTORNEYS April 4, 1944.　　　M. A. WECKERLY　　　2,346,121
WEIGHING SCALE
Filed July 30, 1940　　　3 Sheets-Sheet 2
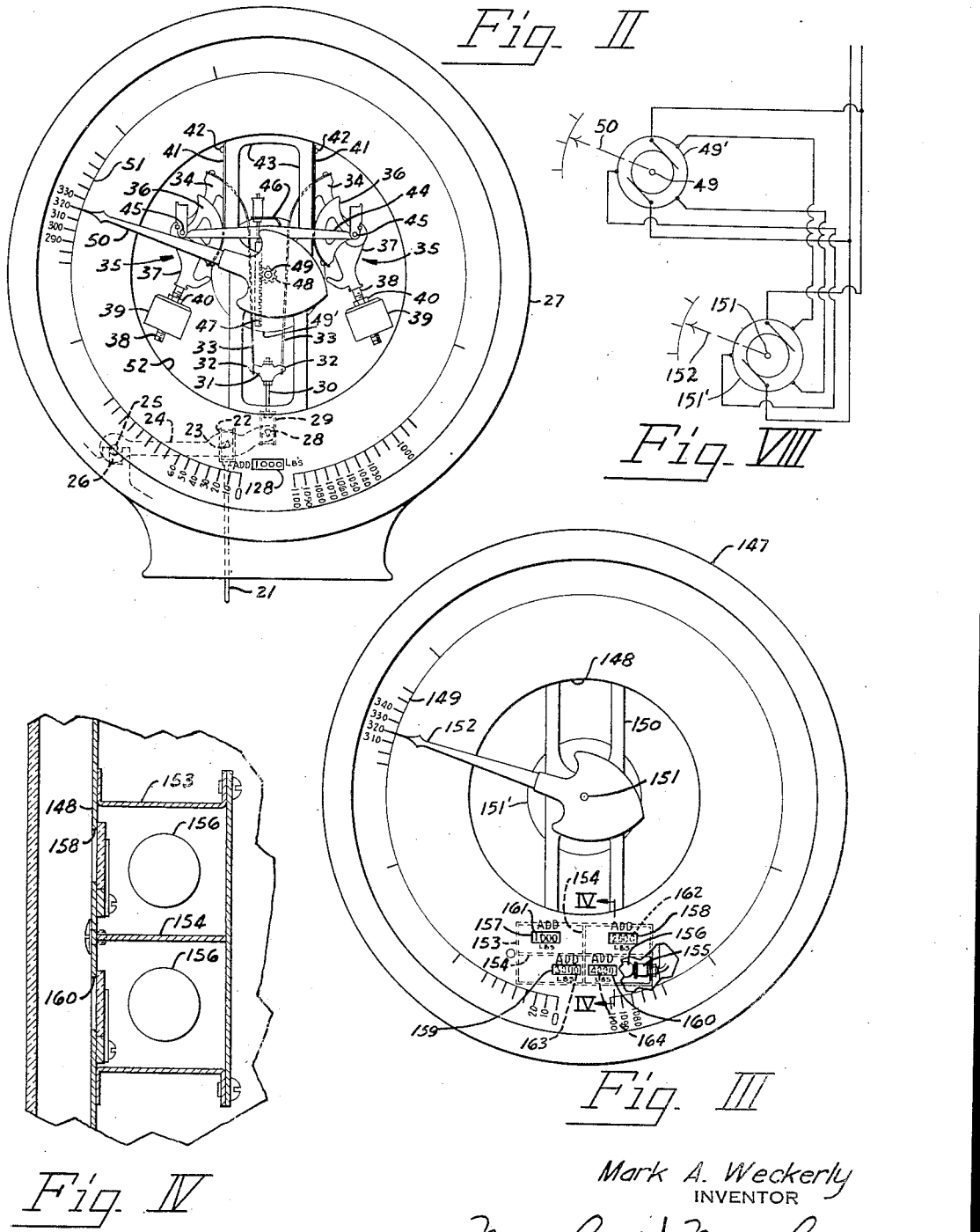
Mark A. Weckerly
INVENTOR
BY Marshall & Marshall
ATTORNEYS April 4, 1944.　　　M. A. WECKERLY　　　2,346,121
WEIGHING SCALE
Filed July 30, 1940　　　3 Sheets-Sheet 3
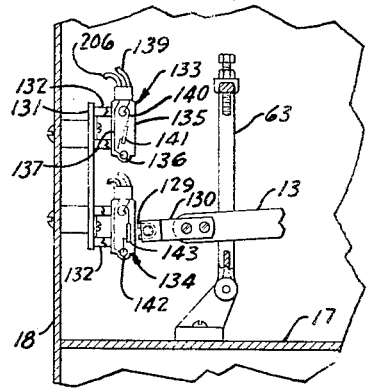
Fig. V
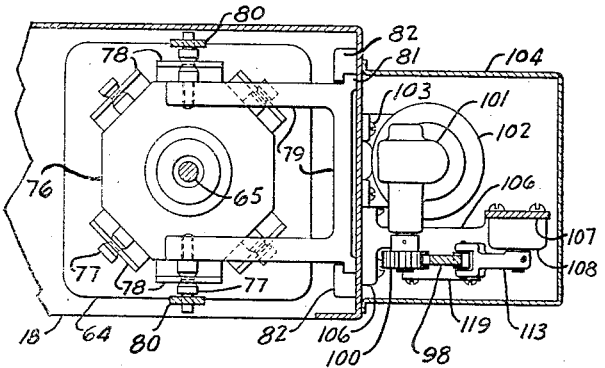
Fig. VI
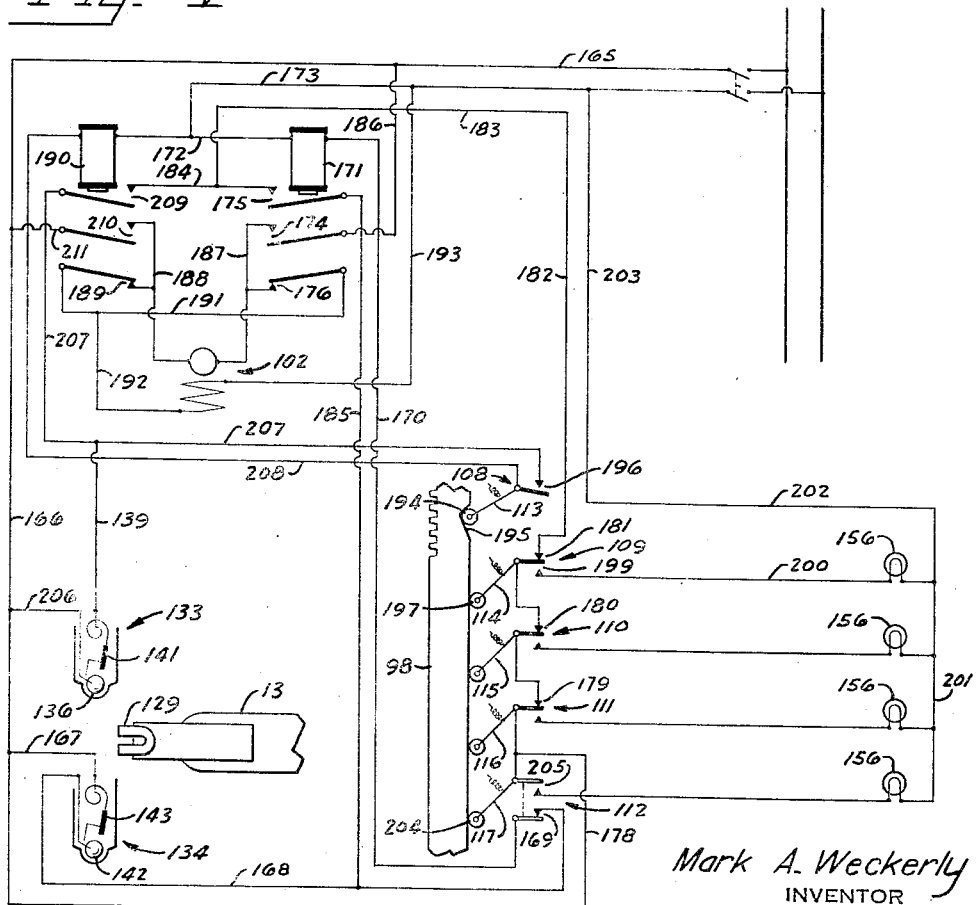
Fig. VII
Mark A. Weckerly
INVENTOR
BY Marshall & Marshall
ATTORNEYS Patented Apr. 4, 1944

2,346,121

UNITED STATES PATENT OFFICE 2,346,121

WEIGHING SCALE

Mark A. Weckerly, Toledo, Ohio, assignor to Toledo Scale Company, Toledo, Ohio, a corporation of New Jersey Application July 30, 1940, Serial No. 348,487

3 Claims. (Cl. 265—48)

This invention relates generally to weighing scales, and more particularly to scales which are provided with means for indicating the weight of the loads weighed upon the scale at a position remote from the location of the scale.

Many methods have been developed for operating remote indicating means in connection with weighing scales but they have been limited to the indication of that portion of the load weighed on the scale which is counterbalanced by the automatic load counterbalancing mechanism of the scale and indicated on the main scale indicator. Many weighing scales are constructed which incorporate additional so-called "unit weights" for increasing the load counterbalancing capacity of the scale without decreasing the sensitivity of indication given by the main scale indicator. This is usually accomplished by means of manually operable weights which are placed on the weighing scale mechanism, one at a time, and each of which increases the capacity of the scale by some fixed amount, for example 500 or 1,000 pounds. In scales so equipped, the unit weights may counterbalance as much as four-fifths or more of the total weighing capacity of the scale, the remaining one-fifth being counterbalanced by automatic load counterbalancing mechanism and indicated by the regular scale indicator attached thereto. The indication of the increased weighing capacity of the scale, that achieved by the unit weights, is usually in the form of small "flags" which state the amount to be added to the indication to give the total weight of the load on the scale. Since these unit weight mechanisms are manually operated, they require the presence of an operator at the scale location Where remote indication is desirable, the presence of an additional operator at the location of the weighing scale is necessary principally for the manipulation of the added capacity unit weights. Although mechanisms have been developed for automatically placing such unit weights on the mechanism of a scale as they may be needed to counterbalance heavy loads, these mechanisms do not give indications of this additional capacity anywhere except at the scale location.

The principal object of the invention is the provision of a remote indicating scale which will indicate not only the fractional amount of the load counterbalanced by the standard automatic load counterbalancing mechanism of the scale but also the major portions of the load counterbalanced by added capacity unit weights, the operation of which is entirely automatic to eliminate the necessity of an operator being stationed at the location of the scale.

It is another object of the invention to provide means for remotely indicating the total weight of loads weighed upon a scale the total weighing capacity of which is greater than that shown by the fractional weight indicator and the similar remote indicator operatively connected thereto.

It is another object of the invention to provide an automatic unit weight mechanism for incorporation within, and as a part of, a remote indicating weighing scale.

A further object of the invention is the provision of an automatically operable remotely indicating weighing scale, the connections between the weighing scale and remote indicating means of which are interconnected with an automatic capacity increasing mechanism and means which remotely indicate such increased capacity.

It is a still further object of this invention to provide a weighing scale having a remote indication both of great sensitivity and small graduations of weight and of high capacity, the operation of which is entirely automatic and does not require the presence of an operator stationed at the scale's location.

These, and other objects and advantages will be apparent from the following description, in which reference is had to the accompanying drawings illustrating a preferred embodiment of the invention and wherein similar reference numerals refer to similar parts throughout the several views.

Referring to the drawings:

Fig. I is a front elevational view of a load counterbalancing section of a weighing scale incorporated in the invention, portions thereof being broken away to more clearly show the operative relationship of the component parts.

Fig. II is an enlarged front elevational view of the load counterbalancing and load indicating means.

Fig. III is a front elevational view of the remotely positioned indicating device.

Fig. IV is a sectional view through the illuminated numeral indicating compartment substantially along the line IV—IV of Fig. III.

Fig. V is an enlarged detailed view of the switches for actuating the automatic capacity changing means and a fragment of the end of the tare beam lever.

Fig. VI is a plan sectional view substantially along the line VI—VI of Fig. I showing particularly the arrangement of the unit weights and the actuating motor;

Fig. VII is a diagram of the electrical circuits.

Fig. VIII is a diagram of a self-synchronous generator motor system connecting the load counterbalancing means illustrated in Fig. II, and the remotely positioned indicating device illustrated in Fig. III.

Referring to the drawings in detail:

As is usual in scales of this character, a load receiving mechanism (not shown) is provided which comprises the usual load supporting levers and load receiving platform. The load moment is transmitted to a tare beam lever through a suitable stirrup on the nose of the load supporting levers through a rod 10, suspended by means of a stirrup 11 from laterally extending pivots 12 in the tare beam lever 13, which, by means of fulcrum pivots 14, is rockably mounted upon a suitable bearing 15 in the upper ends of a fulcrum stand 16 fixedly positioned upon a shelf 17 in the interior of a cabinet 18. This cabinet 18 is usually mounted adjacent the load receiving platform in such a position that the depending rod 10 is vertically positioned to engage the aforementioned stirrup on the nose of the load supporting lever system. Although a so-called extension lever may be interposed between the nose end and the rod 10 the length of such extension lever is necessarily limited.

Power pivots 19, which are in spaced relation to the pivots 12 and 14 in the lever 13, engage a bearing in a stirrup 20 secured to the end of a connecting rod 21 whose upper end, by means of a stirrup 22, engages a load pivot 23 (Fig. II) in a pendulum lever 24 which, by means of a pivot 25, is fulcrumed upon a suitable bearing 26 in the interior of a substantially watchcase-shaped housing 27. A power pivot 28 in the pendulum lever 24 engages a stirrup 29 secured to the lower end of a stem 30 adjustably fixed in a yoke 31 which is clamped by means of screws 32 to the lower end of ribbons 33 whose upper ends overlie and are fastened to arcuate faces of power sectors 34 which form parts of load counterbalancing pendulums 35.

The invention is not dependent upon any particular form of load counterbalancing mechanism and, therefore, the counterbalancing mechanism herein shown is described only in such detail as is necessary to fully disclose the present invention. Each of the load counterbalancing pendulums 35 comprise, in addition to the power sector 34, a pair of fulcrum sectors 36, one of which being stationed on each side of the power sector, a pendulum body 37, a stem 38 and a pendulum weight 39 which is adjustably threaded upon the stem 38 and is adapted to be locked in adjusted position by means of a nut 40.

Flexible metallic ribbons 41, clamped by means of screws 42 to vertical machined tracks of a pendulum frame 43, have their lower ends overlying and clamped to arcuate faces of the fulcrum sectors 36. The ribbons 41 thus support the pendulums 35.

For the purpose of connecting the two load counterbalancing pendulums 35, an articulated frame 44 is provided which is pivotally secured by means of cone-pointed screws 45 to the centers of revolution of these pendulums. A transverse bar (not shown) is pivotally connected to the frame 44 and serves to support a resilient C-shaped member 46 to which a rack 47 is dependingly fastened. The teeth of this rack mesh with the teeth of a pinion 48 circumjacently fixed on a shaft 49 whose ends are mounted in antifriction ball bearings (not shown) seated in transverse webs of the pendulum frame 43. To that portion of the shaft 49 which projects beyond the ball bearing on the front of the scale an indicator 50 is clamped whose tip or index cooperates with the series of indicia 51 printed or otherwise marked on the exposed face of a chart 52 to indicate the weights of loads. This chart is screwed to suitable bosses in the interior of the housing 27 immediately in back of the indicator 50.

To dampen the oscillations of the mechanism a dashpot 53, of usual construction, is provided whose plunger 54 is pivotally connected at 55 to an arm 56 extending laterally from the tare beam lever 13. Tare beams 57 and 59, with their poises 59 and 60, are bolted to projecting arms 61 and 62 and serve to offset the tare weight of trucks and/or containers. To limit the extent of the angular motion of the tare beam, a trig loop 63 is fastened to the shelf 17 adjacent one of the free ends of the lever 13.

The mechanism so far described is capable of automatically counterbalancing a load within the counterbalancing capacity of the automatic load counterbalancing pendulums 35 and indicating the determined weight. Due to the limited size of the chart 52 and the desirability of indicating smaller weight variations than would be possible if the entire weighing capacity of the scale were counterbalanced by the pendulums and indicated on a chart of the type described, such counterbalancing capacity is insufficient for weighing heavy loads and, therefore, scales of this heavy capacity type are usually provided with an auxiliary load counterbalancing unit weight mechanism. This unit weight mechanism comprises a unit weight receiver 64 secured to the lower end of a rod 65, whose upper end is pivotally connected at 66 to a stirrup 67 provided with a V bearing 68 which is supported upon laterally extending pivots 69 in the other free end of the tare beam lever 13. For counterbalancing the dead weight of the load receiving platform and the lever system, not counterbalanced by the moments of the load counterbalancing pendulums 35 when in their initial position, the unit weight receiver 64 is provided with a hollow chamber 70 for the reception of lead or other counterbalancing material. Swinging motion, or oscillation of the receiver 64 about its suspension point, is prevented by a check link 71 whose ends pivotally engage the rod 65 and a fulcrum stand 72 which is mounted upon the bottom of the cabinet 18. The receiver 64 is adapted and arranged to successively receive unit weights 73, 74, 75 and 76. Each of these weights comprises a body portion, which is preferably polygonal in shape and having a raised cone centering means on its upper surface and a correspondingly shaped recess in its bottom. Spool-shaped supporting arms 77 and slotted suspension lugs 78 are secured diametrically opposite each other on the sides of each weight and the slotted lugs 78 of the lowermost weight 73 normally rest upon and are suspended from the supporting arm 77 of the weight 74 immediately above, this weight is similarly suspended from the next adjacent weight and so on, the uppermost weight 76 being directly suspended from the spool-like arms 77 in a guide bracket 79 (Fig. VI) and links 80, the lower ends of which engage tenons projecting outwardly from the guide bracket 79. The guide bracket 79, provided with machined projecting flanges 81, is slidable in ways formed by members 82 on the inner wall of the cabinet 18 to which the members 82 are fastened. The upper ends of the links 80 are pivotally connected at 83 to bifurcated arms of a unit weight operating yoke 84. The other end of this yoke is keyed to a shaft 85, the ends of which being rockingly mounted in bearing brackets 86 fixedly positioned upon a shelf 87 extending between the front and rear walls of the cabinet 18. To an end of the shaft 85, which penetrates the front wall of the cabinet 18, is keyed an operating lever 88. A guide segment 89, fixed to arms 90 extending outwardly from the cabinet 18, is embraced by integral studs 91 projecting laterally from the lever 88 and a plate 92 which is fastened to the ends of the studs 91. The free end of the lever 88 is bifurcated and pivotally engages at 93 a stirrup 94 connected by means of a rod 95 to a similar stirrup 96 which pivotally engages at 97 with a rack 98 having a series of teeth 99 engaging teeth of a pinion 100 keyed to the horizontal terminal shaft of a reduction gearing 101 cooperating with an electric motor 102 bolted at 103 to the outer surface of the side wall of the cabinet 18 and in the interior of a casing 104 provided for housing the aforementioned mechanisms. Also secured to the outer surface of the side wall of the cabinet 18 and within the casing 104, in spaced relation to each other, are two cast brackets 105 and 106, their outer ends being connected by a steel plate 107 to which a series of limit switches 108, 109, 110, 111 and 112 are fastened. The armatures of these switches are connected to spring-urged arms 113, 114, 115, 116 and 117 respectively.

The brackets 105 and 106 are each provided with a recess for the reception of the rack bar 98 and these recesses, in cooperation with plates 118 and 119, form guides for the aforementioned rack bar 98 thus assuring a vertical position thereof at all times and also serving to prevent the disengagement of the rack teeth 99 and the teeth of the pinion 100.

For the purpose of indicating the amount of load on the platform offset by the unit weights 73, 74, 75 and 76, when these are cooperating with the automatic load offsetting mechanism to offset a load on the platform, the yoke 84 has two upstanding integral ears 120 between which a clevis 121 is seated upon a pin 122 extending between these ears. This clevis, by means of a rod 123, is connected to a similar clevis 124 which pivotally engages an arm 125 pivoted at 126 in the indicating housing 27. The opposite end of the arm 125 is provided with a plate 127 bearing a series of numerals which represent weight values offset by the unit weights. The plate 127 is positioned immediately in back of the chart 52 so that one of the series of numerals thereon is visible in an opening 128 in this chart. Appropriate lettering adjacent the opening 128, for example ADD-Lbs., serves to call the attention of the operator to the fact that the amount represented by the figures appearing in this opening must be added to the amount indicated by the indicator 50 on the chart 52.

For a purpose which will later become apparent, a small permanent magnet 129 is clamped in an extension 130 which is fastened to that end of the tare beam lever 13 passing through the trig loop 63 and secured to the adjacent side wall of the cabinet 18 in a vertical plane passing through this magnet is a plate 131 having spaced clips 132 fastened thereto which support and retain mercury magnetic switches 133 and 134. The position of these switches is adjustable in the clips 132. The switch 133, which is substantially in line with the end of the tare beam lever 13 when in its zero or uppermost position, comprises a glass vacuum bulb 135. The lower end of this bulb has a small depression in which a globule of mercury 136 is lying. The end of a wire 137 in the interior of the glass bulb dips into the globule 136 and its other end passes through the wall of the bulb and connects to a lead 206. Another lead 139 penetrates the bulb and is fastened to a small spiral spring 140 which carries a soft iron armature 141 having a tip capable of contacting the globule 136. The spiral spring 140 however has a natural bias for holding the armature 141 out of engagement with the globule 136 until its bias is overcome by the attraction of the small permanent magnet 129 on the end of the tare beam lever 13. The magnetic switch 134 is of similar construction and is provided with a mercury globule 142 and an armature 143. This switch is positioned substantially in alignment with the longitudinal axis of the lever 13 when substantially in its lowermost or full load position.

In scales having a manipulative unit weight system it has been customary to make the counterbalancing capacity of each unit weight exactly the same as the capacity of the automatic load counterbalancing means. This requires that the operator manipulatively places one of the unit weights into cooperative relation with the automatic load counterbalancing mechanism when a load is on the platform which just exceeds the automatic counterbalancing capacity as indicated by the chart. When, however, means are provided for automatically initiating the placement of a unit weight to increase the capacity the operation is too critical if the automatic capacity and the capacity of each of the unit weights is exactly equal for the reason that when a load weighing nearly the amount of the chart capacity is placed on the platform it will oscillate the scale mechanism so that that scale member which controls the automatic placement of the unit weight will oscillate into contact position and increase the weighing capacity at a time when such increase is not called for. For that reason the automatic load counterbalancing capacity in the instant invention is made approximately 10% greater than the counterbalancing capacity of each of the unit weights and the switches 133 and 134, that is the zero and overload switches respectively, are placed so that they will "make" while the indicator 50 is still within the range of the series of indicia 51. For example, if the counterbalancing capacity of each of the unit weights is 1000 pounds then an automatic counterbalancing capacity of 1100 pounds is provided and the overload switch 134 is set to "make" when the indicator points to the 1050 pound indicium on the chart and the zero switch is set to "make" when the indicator registers with the 10 pound indicium on its return stroke. In this manner a weight amounting to less than 1050 pounds will be automatically indicated on the chart without placing the first unit weight 73 of the series into cooperative relation when the movement of the levers is aperiodic but when the same load is deposited upon the platform in such a manner as to cause the lever 13 to oscillate to or beyond its contact angle the overload switch 134 will "make" and, in the manner hereinafter described, will deposit unit weight 73 on its receiver 64 and the weight of this load is then indicated by the cooperation of the indicia 51 on the chart 52 and the indicia on the flash 127.

The automatic unit weight manipulating mechanism just described eliminates the necessity of stationing an operator at the scale's location to manually place sufficient unit weights on the scale to counterbalance the load being weighed thereon. Since, of course, in remote weighing scales a clerk is usually stationed at the remote weighing head, for example in an office, it is expensive to maintain a second weighman at the scale's location. This automatic unit weight mechanism eliminates this additional weighman and enables the indication of both the weight counterbalanced by the pendulum mechanism and that counterbalanced by the unit weights to be remotely indicated.

The remote indicating mechanism includes a housing 147 in which is mounted a chart 148 having a series of indicia 149 which is a duplicate of the chart 52 and the series 51 marked thereon. If indication at the scale location is not desirable, the indicator 50 and chart 52 may, of course, be eliminated from the mechanism located there.

A frame 150 which may be identical with the frame 43, and in which antifriction ball bearings are mounted in a similar manner (Fig. III), is bolted within this housing and a shaft 151, which is seated in these ball bearings (not shown), has clamped to its forward extending end an indicator 152 which cooperates with a series of indicia 149, and the end of the shaft 151, which extends to the rear of the frame 150, is clutched coaxially to the shaft of the rotor of a receiver 151' of a self-synchronous generator and receiver motor system while the shaft 49 in the housing 27 is coaxially clutched to the rotor of the generator or transmitting member 49' of this system (Fig. VIII). These systems are on the market under the name "Selsyn" and since they are well known and used for many purposes it is thought unnecessary to give a more detailed description. Any movement of the indicator 50, through this self-synchronous transmitter or generator and receiver system, is transmitted to the indicator 152 and the angle through which the indicator 50 rotates under the influence of a load on the platform is duplicated by the indicator 152 so that the same indication may be had at the scale and at the point where the remote indicating housing 147 is located.

For indicating the amount of the load, counterbalanced by the auxiliary load counterbalancing means, at the remote indication, a casing 153 (Figs. III, IV) is fastened to the back of the chart 148, longitudinal and vertical partitions 154 divide this casing into four rectangular light-tight compartments each of which contains a socket 155 and an electric lamp 156. Located, within the area of each compartment, in the chart 148 are four openings 157, 158, 159 and 160, each glazed with a sheet of translucent material on the back of which are printed numerals 161, 162, 163 and 164 respectively. These numerals represent the value of the amount of the load being counterbalanced by the auxiliary, unit weight load counterbalancing mechanism and are visible only when the lamp 156 in back of the translucent material is energized.

The operation of the device is as follows:

Assuming that a load in excess of the automatic weighing capacity of the scale, for example, 1320 pounds, has been placed upon the platform, through the mechanism described, the moment of the load causes the left end of the tare beam lever 13 to rock downwardly to its lowermost position and the permanent magnet 129 (Fig. VII) on the end of this tare beam lever attracts the armature 143 of the mercury switch 134 causing it to contact the mercury globule 142 in the bottom of this switch. This causes current to flow from the source over leads 165, 166, 167, armature 143, globule 142, lead 168, normally closed contact 169 of limit switch 112, lead 170, relay 171, leads 172 and 173 to the other side of the source. The relay 171 is energized, closing its normally open contacts 174 and 175 and opening its normally closed contact 176. When the contact 175 is closed current flows from one side of the source over leads 165, 166, 177, 178, normally closed contacts 179, 180, 181 of limit switches 111, 110 and 109 through leads 182, 183, 184, contact 175, leads 185, 186, contact 169 of limit switch 112, lead 170, relay 171 and through leads 172 and 173 to the other side of the line. This circuit seals the previously described circuit when the magnet 129 on the lever 13 releases the armature 143 of the switch 134 and when this armature under the bias of its spring mounting breaks its contact with the mercury globule 142. Simultaneously with the closure of the contact 175, contact 174 also closes. This establishes a circuit from the source through leads 165, 186, contact 174, lead 187, armature of motor 192, lead 188, normally closed contact 189 of relay 190, leads 191 and 192, field coil of motor 192 and through leads 193 and 173 to the other side of the source. This energizes the motor 192 and through its reduction gearing 101 and pinion 100, operatively fixed thereto, causes the rack 98 to move downwardly, depositing the lower unit weight 73 upon the unit weight receiver 64, through the means described. The weight of this unit weight overbalances the weight moment of the load on the platform and the left end of the lever, with its magnet 129, moves upwardly.

Immediately upon movement of the rack 98, a roller 194 on the end of armature arm 113 of the limit switch 108 is cammed out of a notch 195, cut in a predetermined position in the rear edge of the rack 98, thus forcing the armature of this switch to close a normally open contact 196, for a purpose which will later become clear.

When the unit weight 73 is freely resting upon the receiver 64, the rack 98 is in such a position that a roller 197 on armature arm 114 of limit switch 109 enters the notch 195. This opens normally closed contact 181 of this switch, breaking the previously described holding circuit and de-energizing the motor 192, arresting thereby any further movement of the rack 98. The armature of switch 109 closes the normally open contact 199 of this limit switch and current flows from the source through the leads 165, 166, 177, 178, normally closed contacts 179 and 180 of limit switches 111 and 110 respectively, contact 199, lead 200, lamp 156, leads 201, 202, 203 and through lead 173 to the other side of the line. The lamp 156 is located in that light-tight compartment formed by the casing 153 and the partitions 154 which has the indicium 161, which in this case is "1000," printed on the rear of the translucent material which glazes the opening 157 of the remotely indicating means. If, as assumed, the weight of the load on the platform of the scale is 1320 pounds the indicator 50 in the head 27 now points to the 320 indicium on the chart 52 in the housing 27 and through the synchronous transmitter and receiver mechanism the indicator 152 has also been turned through a corresponding angle so that it points to the 320 pound indicium on the chart 148 in the remote indicating housing 147. The plate 127, stationed immediately in back of the opening 128 in the chart 52, through the means previously described, has been positioned so that it displays "1000" in this opening. Thus, if desirable, by adding the amount indicated by the hand 50 to the amount indicated in the opening 128, the total weight of the load, namely 1320 pounds can be read at the scale's location. The observer of the remote indication reaches the same result by adding the amount indicated by the indicator 152 to the illuminated amount in the opening 157. If the load which has been placed on the platform of the scale is greater than the combined counterbalancing capacity of the unit weight 73 and that of the automatic load counterbalancing pendulums 35 the lever 13 will remain in its lowermost position after the cycle depositing the lowermost unit weight 73 has been completed and this unit weight has been deposited on the receiver 64. The repetition of this cycle will deposit the next unit weight 74 upon unit weight 73. If the combined counterbalancing capacities of these two unit weights and that of the pendulums 35 is greater than the weight of the load, the numerals "2000" will appear in the openings 128 and 158 to be added to the weight indicated by the indicators 50 and 152, but if the load is greater the cycle will automatically repeat and the unit weight 75 will be deposited upon unit weight 74 and if this is not sufficient the last unit weight 76 will be deposited upon unit weight 75 and the indication observed in the manner described. When the unit weight 76 is deposited upon unit weight 75 the notch 195 in the rack 98 is now in a position to receive a roller 204 on the armature arm 117 of limit switch 112. This causes the normally open contact 205 of this limit switch to illuminate that lamp 156 which illuminates the figure "4000" in the opening 160 in the chart 148 and it opens the normally closed contact 169 of this switch, this breaks the holding circuit which energizes the motor 102 even when the load on the platform is greater than the combined counterbalancing capacities of the scale pendulum mechanism and the unit weights even when the armature 143 is still in contact with the mercury globule 142 in the switch 134. This prevents the motor 102 from rotating after the last unit weight 76 has been placed into cooperative relation with the counterbalancing mechanism. After the weight of the load is determined and it is removed from the platform, the lever 13 moves into its zero position and the magnet 129 now attracts the armature 141 of the zero switch 133 and this armature contacts the mercury globule 136 therein closing a circuit which permits current to flow from the source over leads 165, 166, 206 through the aforementioned globule 136 and armature 141 through leads 139, 207 and contact 196 which at this time is closed, through lead 208, relay 190, leads 172 and 173 to the other side of the line. This energizes the relay 190 and closes its normally open contacts 209 and 210 and opens its normally closed contact 189. Closing the contact 210 permits current to flow from the source over leads 165, 166, 211, contact 210, lead 188, the rotor of motor 102, contact 176, leads 191, 192, field coil of motor 102, and through leads 193 and 173 to the other side of the line. This energizes the motor 102 but causes it to rotate in the opposite direction, raising the rack 98 through the pinion 100 until all of the unit weights on the receiver 64 have been lifted therefrom and the notch 195 is in a position to receive roller 194 on armature arm 113 of limit switch 108. This opens contact 196 in the circuit energizing the relay 190 and upon de-energization of this relay contact 210 opens, stopping the motor 102. The scale is now in zero balance, the indicators 50 and 152 point to the zero indicia on the charts 52 and 148, the numeral "0" on the plate 127 is visible in the opening 128 and none of the glazed openings 157, 158, 159 and 160 are illuminated and the scale is ready to receive another load.

Since the lever 13 oscillates to a position slightly above the position in which the switch 133 is positioned, a seal is provided to hold the motor 102 in its energized condition upon disengagement of the armature 141 from the globule when the magnet 129 moves past and the magnetic attraction on the armature 141 ceases. Closure of contact 209 permits current to flow from one side of the source over leads 165, 166, 177, 178, contacts 179, 180, 181, leads 182, 183, 184, contact 209, lead 207, contact 196, lead 208, relay 190 and through leads 172 and 173 to the other side of the source. This circuit will maintain the relay 190 in its energized condition even though the switch 133 is open and will maintain it in this energized condition until one of the contacts 179, 180, 181 or 196 is opened.

Having described the invention, I claim:

1. In a remote indicating weighing scale employing automatic and counterpoise counterbalancing means, in combination, mechanism including a reversible motor for adding and removing counterpoise weights, electrical means to control said motor, said electrical means including sensitive switches operable by said automatic counterbalancing means to initiate operation of said motor and a plurality of limit switches operable by said mechanism to deenergize said motor upon completion of the operation of adding or removing a counterpoise weight, and electrically operated signals also controlled by said limit switches to indicate at a remote station the load counterbalanced by said counterpoise counterbalancing means.

2. In a remote indicating weighing scale incorporating automatic and counterpoise counterbalancing means, in combination, mechanism including a reversible motor for adding or removing counterpoise weights, electrical means for controlling said motor, said electrical means comprising sensitive switches operable by said automatic counterbalancing means to initiate operation of said motor, relays to maintain operation of said motor, and limit switches operable by said mechanism to deenergize said motor upon completion of the operation of adding or removing a counterpoise weight, and remote signals controlled by said limit switches to indicate the load counterbalanced by said counterpoise counterbalancing means.

3. In a remote indicating weighing scale incorporating automatic and unit weight counterbalancing means, in combination, mechanism including a reversible motor for adding and removing unit weights, electrical means for controlling said motor, said electrical means comprising sensitive switches operated by said automatic counterbalancing means to initiate the addition or removal of a unit weight, relays to maintain the motor operation initiated by said sensitive swiches, limit switches, one for each position of said unit weight applying mechanism, operable by said mechanism for terminating the motor operation at the completion of the addition or removal of a unit weight, and electrically operated remote signals controlled by said limit switches for indicating the load counterbalanced by the unit weights.

MARK A. WECKERLY.